United States Patent [19]
Tischer et al.

[11] Patent Number: 5,323,809
[45] Date of Patent: Jun. 28, 1994

[54] HYDRAULIC SOLENOID VALVE

[75] Inventors: Dieter Tischer, Kirchheim/Teck; Bernd Niethammer, Nürtingen, both of Fed. Rep. of Germany

[73] Assignee: Hydraulik-Ring GmbH, Nürtingen, Fed. Rep. of Germany

[21] Appl. No.: 959,318

[22] Filed: Oct. 9, 1992

[30] Foreign Application Priority Data

Oct. 10, 1991 [DE] Fed. Rep. of Germany ....... 4133536

[51] Int. Cl.$^5$ .......................................... F15B 13/044
[52] U.S. Cl. ............................ 137/596.17; 137/513.5; 137/625.65; 251/51
[58] Field of Search ........... 137/513.5, 596.17, 625.65; 251/51

[56] References Cited

U.S. PATENT DOCUMENTS

| | | | |
|---|---|---|---|
| 4,669,504 | 6/1987 | Fujitsugu et al. | 137/625.65 |
| 5,144,881 | 9/1992 | Cakmaz | 137/596.17 X |
| 5,209,261 | 5/1993 | Cakmaz et al. | 137/596.17 |

FOREIGN PATENT DOCUMENTS

| | | |
|---|---|---|
| 2129183 | 12/1971 | Fed. Rep. of Germany . |
| 2506864 | 8/1976 | Fed. Rep. of Germany . |
| 3141705 | 4/1983 | Fed. Rep. of Germany . |
| 3144362 | 5/1983 | Fed. Rep. of Germany ........................ 137/625.65 |
| 3938417 | 3/1991 | Fed. Rep. of Germany . |

Primary Examiner—Gerald A. Michalsky
Attorney, Agent, or Firm—Robert W. Becker & Associates

[57] ABSTRACT

A hydraulic solenoid valve includes a valve housing with bores for receiving a hydraulic medium and having at least one consuming device connection and a return connection connected to the bores. A piston is connected within the valve housing and has at least one piston bore. A first valve with a corresponding valve seat is connected to the piston for opening and closing the piston bore. The first valve in its open position provides communication between the consuming device connection and the reservoir connection. A magnet housing has connected therein an armature. When the armature is displaced during normal operation in both directions, it rests at the first valve and forces the first valve into its valve seat. A return spring is positioned between the piston and the valve housing. The armature is displaceable by the force of the return spring. The piston is displaceable by the armature against the force of the return spring. The armature has at least one throttle passage on an end face facing away from the piston through which during displacement of the armature by the force of the return spring the hydraulic medium flows and generates a pressure counteracting the force of the return spring.

19 Claims, 3 Drawing Sheets

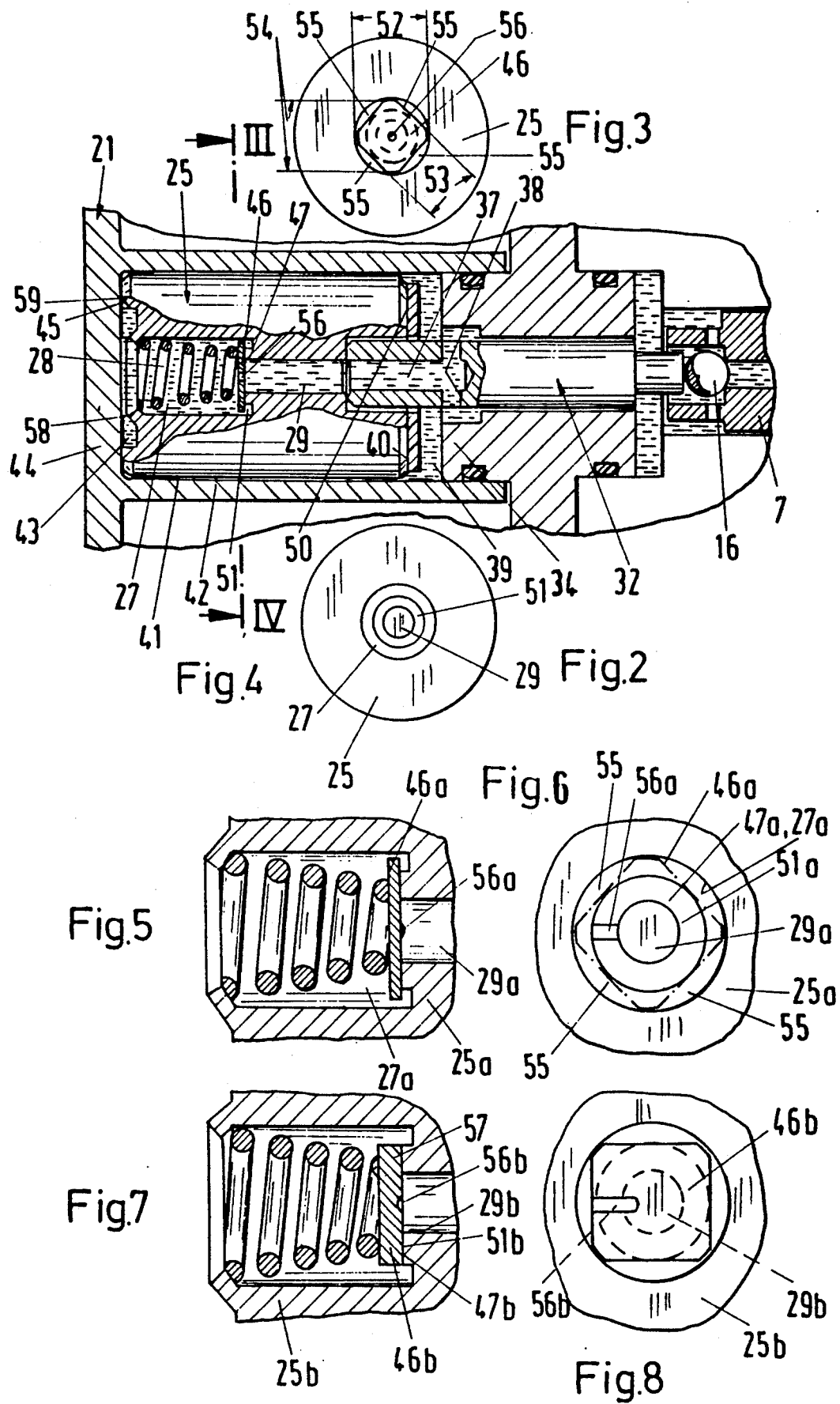

HYDRAULIC SOLENOID VALVE

BACKGROUND OF THE INVENTION

The invention relates to a hydraulic solenoid valve with a piston that is displaceable by an armature against the force of at least one return spring and has at least one valve bore which is closable by a valve, preferably, a valve ball, which when the valve is open provides a flow connection between at least one consuming device connection and a reservoir connection of the solenoid valve, whereby the armature in normal operation during displacement in both directions rests at the valve and maintains it in contact with the valve seat.

In this known hydraulic solenoid valve the piston bore is closed by a valve that is held in its closed position by the armature. In the normal operation the armature rests constantly at this valve so that the piston bore remains closed. During operation of such solenoid valves it may happen that the piston jams in its switched position. When the armature then returns into its initial position, the piston may not follow this axial movement of the armature so that the pressure within the consuming device connection remains constant. In order to prevent in this case an overload of the consuming device connected to the consuming device connection the aforementioned valve is provided that because of the returning armature is no longer pressed into its valve seat. Due to the pressure present at the consuming device connection the valve is lifted off its valve seat so that the hydraulic medium can flow back via the now open piston bore to the reservoir connection. In this manner the pressure within the consuming device connection is reduced despite the jammed piston. This safety circuit is very advantageous in an emergency situation, however, it has the disadvantage that the valve during normal operation, i.e., during normal switching processes, can be lifted off the valve seat in an uncontrollable manner, especially when the piston is moved by the return spring. When the valve accidentally is lifted, the hydraulic medium can be ejected in a jet-type manner through the, possibly only partially, opened valve bore. This results in jet forces in the axial direction which act against the return spring and thus result in switching time changes. Furthermore, the sudden lifting of the valve from its seat generates switching noises. These two disturbance factors result in an unsatisfactory pressure and noise behavior.

It is therefore an object of the invention to embody the hydraulic solenoid valve of the aforementioned kind such that an uncontrollable lifting of the valve during normal operation is reliably prevented, but to reliably ensure the safety function of the hydraulic solenoid valve when the piston jams.

SUMMARY OF THE INVENTION

This object is inventively solved for the hydraulic solenoid valve of the aforementioned kind by providing at least one throttle passage the end face of the armature facing away from the piston through which throttle passage during displacement of the armature by the force of the return spring the hydraulic medium flows under generation of a pressure counter to the spring force. The inventive solenoid valve is primarily characterized by: a valve housing including bores for receiving a hydraulic medium and having at least one consuming device connection and a reservoir connection connected to the bores; a piston connected within the valve housing, the piston having at least one piston bore; a first valve with a corresponding valve seat, the fist valve connected to the piston for opening and closing the valve bore, the first valve in an open position providing communication between the consuming device connection and the reservoir connection; a magnet housing; an armature connected within the magnet housing and, when displaced during normal operation in both directions, resting at the first valve and forcing the first valve into the valve seat; a return spring connected between piston and the valve housing, the armature displaceable by the force of the return spring; the piston displaceable by the armature against the fore of the return spring; and the armature having at least one throttle passage on an end face thereof facing away from the piston through which during displacement of the armature by the force of the return spring the hydraulic medium flows and generates a pressure counteracting the force of the return spring.

When the armature of the inventive hydraulic solenoid valve is returned via the piston and its return spring into the initial position the hydraulic medium in front of the armature can only flow through the throttle passage. Due to the delayed flow of the hydraulic medium a hydraulic pressure is generated in front of the armature which acts against the force of the return spring. Accordingly, the armature during its return is strongly pressed against the valve at the piston side so that it cannot accidentally be lifted off the valve seat. The piston bore thus cannot be opened in an uncontrollable manner during normal operation by a lifting of the valve. However, the safety function of this valve at the piston side is maintained so that during a possible jamming of the piston it is ensured that the pressure within the consuming device connection is reduced by release of the valve and opening of the piston bore.

In the inventive hydraulic solenoid valve the two hydraulic chambers on either side of the armature are connected by a connecting lien that is causable by the second valve. When the piston is displaced from its initial position by the armature against the force of the return spring, the hydraulic medium in the second hydraulic chamber between the piston and the armature flows through the connecting line against the second valve and opens it. Thus, the hydraulic medium is quickly displaced into the first hydraulic chamber. This results in a very high switching speed, i.e., the piston and the armature are practically displaced in an undampened manner to their switching position. When the piston together with the armature is returned by the force of the return spring from the switching position into the initial position, the second valve is returned into its closed position due to the hydraulic pressure within the first hydraulic chamber. Accordingly, the hydraulic medium within the first hydraulic chamber can only flow through the throttle passage. Within the first hydraulic chamber remote from the piston a pressure is therefore generated by the returning armature which counters the force of the return spring. With this measure it is thus ensured that during the return of the armature the first valve cannot accidently lift off its valve seat, and a slowed return of the armature is achieved. Furthermore, the safety function of the hydraulic solenoid valve is maintained so that during a possible jamming of the piston it is ensured that the pressure within the consuming device connection is released by opening the first valve and opening the piston bore.

Further features of the invention can be taken from the further claims, the description and the drawings.

BRIEF DESCRIPTION OF THE DRAWINGS

The invention will be described in detail with two embodiments represented in the drawings. It is shown in:

FIG. 2—the safety device of the inventive valve in an enlarged representation and in a longitudinal cross-section, FIG. 3—a view in direction of arrow III of FIG. 2, FIG. 4—a view in direction of arrow IV of FIG. 2, FIG. 5—a plate valve of the safety device of the inventive valve in an enlarged cross-sectional representation, FIG. 6—a plan view of the plate valve according to FIG. 5, FIGS. 7 and 8—a second embodiment of a plate valve of the safety device of the inventive valve in representations corresponding to FIGS. 5 and 6, FIGS. 9 to 14—further embodiments of the valves of the safety device of the inventive valve in representations corresponding to FIGS. 5 and 6.

DESCRIPTION OF PREFERRED EMBODIMENTS

Figure 1:
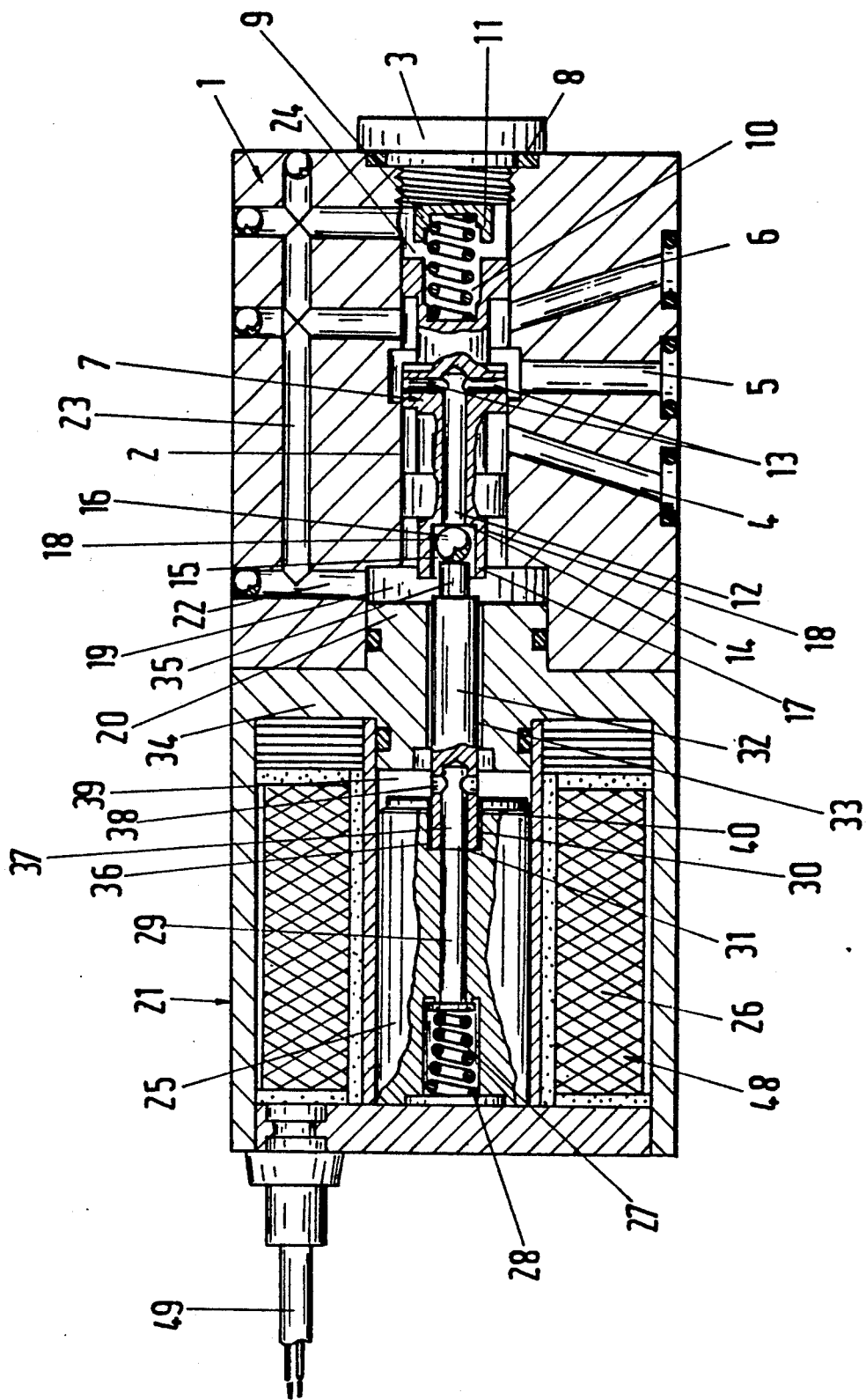
FIG. 1—an inventive hydraulic solenoid valve in a longitudinal cross-section.

The valve has a valve housing 1 in which a central valve bore 2 is provided which extends axially through the valve housing 1. One end of the valve bore 2 is closed by a stopper 3. A hydraulic oil connection 4, a consuming device connection 5, and a return connection 6 open into the valve bore 2. A piston 7 is slidably supported within the valve bore 2.

The stopper 3 with its head rests at the outer wall of the valve housing 1 with a sealing, preferably a sealing ring, interposed. The stopper 3 serves as an abutment for the return spring 9 which is embodied as a coiled pressure spring and which rests with its other end at the piston 7. For the axial alignment of the return spring 9 the piston 7 is provided with a recess 10 at its end face, into which the return spring 9 extends with its end. The other end of the return spring 9 is positioned in a cup-shaped recess 11 which is provided at the stopper 3.

The piston 7 has an axially extending bore 12 which is connected with the consuming device connection 5 via transverse bores 13. The centrally and axially extending piston bore 12 opens into a planar surface 14 of the piston 7 that is remote from the return spring 9. The planar surface 14 forms the bottom of a recess 15 in which a valve ball 16 is positioned with which the piston bore 12 is closed. The diameter of the valve ball 16 is slightly smaller than the inner diameter of the recess 15 so that the valve ball 16 in a manner to be described infra can lift off the planar surface 14 for opening the valve bore 12. The inner wall 17 of the recess 15 is penetrated by transverse bores 18.

The valve housing 1 has a depression 19 at its side facing away from the stopper 3 into which a projection 20 of a magnet housing 21 extends in a form-fitting manner. The projection 20 rests in a sealing manner at the wall of the depression 19 of the valve housing 1. The end face of the projection 20 is positioned at a distance from the bottom of the depression 19 so that a hydraulic chamber is formed into which a transverse bore 22 of the valve housing 1 opens. It is connected via a longitudinal bore 23 with the return connection 6 and a hydraulic chamber 24 which is positioned between the stopper 3 and the piston 7.

An armature 25 is axially slidably supported within the magnet housing 21 and is surrounded by a coil 26. The armature 25 has a recess 27 at its end face facing away from the valve housing 1 in which recess a prestress spring is arranged. A centrally arranged bore 29 which axially penetrates the armature 25 opens into the bottom of the recess 27 and opens with its other end into the bottom 31 of a recess 30 which is provided at the end face of the armature facing the valve housing 1. A magnetic stem 32 extends into this recess 30 and is axially slidably positioned in a through bore 33 in the end face 34 of the magnet housing 21 facing the valve housing 1. The through bore 33 centrally penetrates the projection 20 of the magnet housing 21. The stem 32 has a diameter-reduced portion 35 at its end which is facing the valve housing with which it rests at the valve ball 16. The diameter of the portion 35 is smaller than the inner diameter of the recess 15 of the piston so that the stem 32 can be reliably axially displaced.

As is shown in FIG. 1, the stem 32 rests at the bottom 31 of the recess 30 of the armature 25. The diameter of the stem 32 is smaller than the inner diameter of the recess 30 so that between the armature 32 and the wall of the recess 30 a narrow annular space 36 remains. A longitudinal bore 37 opens into the end face of the stem 32 resting at the bottom 31 and forms an extension of the bore 29 of the armature 25 and has the same diameter as the bore 29. The longitudinal bore 27 is embodied as a blind end bore into which transverse bores 38 open which connect the longitudinal bore 37 with the hydraulic chamber 39 between the end face 34 of the magnet housing 21 and the neighboring end face 40 of the armature 25.

As is shown in FIG. 2, the armature 25 is positioned with little radial play 41 within a pressure tube 42 that is a unitary part of the magnet housing 21. Due to this radial play an annular chamber 41 is formed with which the hydraulic chamber 39 is connected to a further hydraulic chamber 43 between an end face 44 of the magnet housing 21 and the neighboring end face 45 of the armature 25.

The bore 29 within the armature 25 is closed by a valve 46, preferably a plate valve, that under the force of the prestress spring 28 rests in a sealing manner at the bottom 47 of the recess 27 of the armature 25.

In the position of the piston 7 represented in FIG. 1 the consuming device connection 5 is connected with the return, respectively, reservoir connection 6. The valve ball 16 between the stem 32 and the end face 14 of the piston 7 facing the magnet closes the bore 12 which is connected via the transverse bores 13 with the consuming device connection 5. During normal operation of the magnet valve the ball seat of the bore 12 remains constantly closed. The armature 25, the stem 32, and the piston 7 form a quasi-rigid connection during normal operation of the solenoid valve which is displaced within the solenoid valve as a unit. The magnet housing 21 contains the magnet 48 which may be a switching or a control magnet. When using a switching magnet the armature 25 and thus the piston 7 are only moved into two switching positions, while when a control magnet is used, depending on the electric current supply of the magnet, the armature can be displaced by different travel lengths so that the piston 7 can be respectively finely adjusted within the valve housing 1. The operational manner of such control magnets is well known and will not be explained in further detail.

With such a solenoid valve it may happen that the piston 7 jams in its switched position during an operational disturbance, for example, due to contaminations within the hydraulic oil. When the stem 32 is returned, the piston 7, under the force of the return spring 9, cannot be displaced accordingly because the piston 7 jams. Thus, the pressure within the consuming device connection 5 acts via the transverse bores 13 and the longitudinal bore 12 of the piston 7 on the valve ball 16 which is thus lifted off its seat. The consuming device connected to the consuming device connection 5 is accordingly relieved because now the hydraulic medium may flow via the transverse bores 13, the longitudinal bore 12, the hydraulic chamber 19, the transverse bore 22, and the longitudinal bore 23 to the return connection 6. Thus, it is prevented that an overload of the consuming device occurs when the piston 7 jams.

To prevent the valve ball 16 during normal switching processes from an accidental lifting off the ball seat, the solenoid valve is provided with a safety device located within the magnet housing 21. Without such a safety device it may happen that the valve ball 16, especially when the piston is moved by the return spring 9 when the armature 25 is returned, may lift off the ball seat in an uncontrollable manner such that the consuming device connection 5 is accidentally connected via the transverse bore 13, the bore 12, the cylinder chamber 19, the transverse bore 22, and the longitudinal bore 23 with the return flow connection. In such a case jet forces in the axial direction occur. The hydraulic medium flows in a jet-type manner from the partially open bore 12. The thus resulting jet forces counteract the return spring 9 and effect thereby switching time changes. Furthermore, due to the sudden lifting of the valve ball 16 from the valve ball seat switching knocks result. Without the safety device, these two disturbance factors would result in an unsatisfactory pressure and noise behavior.

With the described safety device it is prevented that the valve ball 16 during normal operation is lifted from its ball seat and thus effects a connection between the consuming device connection 5 and the return flow connection 6. Due to the safety device the solenoid valve can be optimized with regard to switching times and minimized switching noises relative to the corresponding system. Due to the safety device it is ensured that the valve ball 16 between the stem 32 and the piston can only be lifted during emergency situations when the piston 7 jams. The different switching times for switch-on and switch-off operation can be effectively adapted and optimized.

With the annular space 41 between the armature 25 and the pressure tube 42 an exchange of hydraulic oil between the two hydraulic chambers 39 and 43 is possible. The radial width of the annular space 41 and thus the radial play that the armature 25 has within the pressure tube 42 must be dimensioned such that the oil exchange along the mantle surface of the armature 25 is minimized so that the oil exchange is primarily determined by the bore 29 within the armature 25.

When the magnet 48 is supplied with electricity via the electrical supply line 49 (FIG. 1) the armature 25 is pulled, i.e., it moves to the right in FIGS. 1 and 2. This results in the lifting of the plate valve 46 off the bottom 47 of the recess 27 in the armature 25 against the force of the prestress spring 28. This lifting of the plate valve 46 results from the flow of hydraulic oil present within the hydraulic chamber 39 via the transverse bores 38 of the stem 32 and the longitudinal bore 37 into the bore 29 of the armature 25 during displacement of the armature 25. Under the pressure of the hydraulic oil the plate valve 46 is lifted against the force of the prestress spring 28 off the plate seat 47. The bores 37 and 29 have sufficiently great flow cross-sections so that the hydraulic oil during pulling of the armature 25 may be quickly displaced from the hydraulic chamber 39. Since the annular space 41 between the armature 25 and the pressure tube 42 has only a small radial width, an oil exchange via this passage is only possible to a limited extent so that the main oil exchange takes place via the bores 37 and 29. This allows for a high switching velocity.

The armature 25 travels against the stroke-limiting end face 34 of the magnet housing 21 In order to reduce or completely prevent the resulting impact noise, the end face 40 of the armature 25 which is facing the end face 34 is provided with a shock-absorbing layer 50 which is comprised of an elastically deformable material and has very high shock absorbing properties. Via the stem 32 the piston 7 is displaced corresponding to the stroke of the armature 25 within the valve housing 1. The armature 25, the stem 32, the valve ball 16 and the piston form a displacement unit whereby the individual parts rest fixedly at one another. The piston 7 is axially displaced against the force of the return spring 9 within the valve bore 2.

When the armature 25 remains stationary the prestress spring 28 forces the plate valve 46 again against the seat 47 and closes the bore 29. This provides the condition for the following decrease process in which the armature 25 is returned in the direction to the left into the initial position shown in FIGS. 1 and 2. The return spring 9 displaces the piston 7 to the left in FIGS. 1 and 2 thereby displacing via the valve ball 16 and the stem 32 the armature 25. The hydraulic oil present in the hydraulic chamber 43 is displaced via a jet device within the closed plate valve. This will be explained in the following with the aid of FIGS. 3 and 4.

The plate valve 46 rests at the end face 47 of an annular projection 51 projecting from the bottom of the recess 27. It is expediently embodied as a unitary part of the armature 25. The annular projection 51, as is shown in FIG. 4, has a circular cross-section and is arranged coaxial to the recess 27. The recess 27 has a diameter 52 (FIG. 3). The plate valve 46, as is shown in FIG. 3, has a square shape with rounded corners with which the plate valve 46 is guided at the inner wall of the annular projection 51. The edge length 53 is smaller than the diameter 52 of the recess 27. The diagonal 54 of the plate valve 46 corresponds to the diameter 52 of the recess 27. Due to the aforementioned square embodiment of the plate valve 46 between the plate edges and the side wall of the recess 27 segment-shaped flow passages 55 for the hydraulic oil are produced. The plate valve 46 is centrally penetrated by a flow through opening 56 which in comparison to the bore 29 of the armature 25 has a very small flow cross-section and opens into the bore 29. The medium present within the hydraulic chamber 43 has thus the possibility to reach the bore 29 of the armature 25 through the flow through opening 56 so that during return of the armature the hydraulic medium can flow back from the chamber 43 into the chamber 39. Since the flow through opening 56 has only a small flow cross-section during return of the armature 25 a pressure is built up within the hydraulic chamber 43 which acts against the force of the return spring 9. Accordingly, it is ensured that during the return of the armature 25 the piston 7, the valve ball 16, the stem 32, and the armature 25 are fixedly resting at one another. The valve ball 16 thus cannot accidentally be lifted off the valve seat. Furthermore, this ensures a dampened return of the armature 25.

The plate valve 46, depending on the constructive circumstances, may, for example, also have a triangular, pentagonal, non-circular or any other suitable contour.

When during operation of this solenoid valve the piston 7, for example, due to contaminations within the hydraulic medium, should jam within the valve bore 2, the armature 25 is returned, however, the piston 7 stalls. Due to the pressure within the connected consuming device the valve ball 16 is then lifted in the aforedescribed manner off the valve seat and the connection between the consuming device connection 5 and the return, respectively, reservoir connection 6 is opened. Except for this emergency situation, the valve ball 16 cannot accidentally be lifted off the ball seat due to the aforedescribed safety device.

FIGS. 5 and 6 show embodiments in which the flow through gap 56a is formed as a depression within the end face 47a of the annular projection 51a. The plate valve 46 is otherwise identically embodied as the embodiment according to FIGS. 1 to 4. In FIG. 6 the plate valve 46a is indicated with a dash-dotted line. When the magnet armature 25a is moved to the left (relative to the representation according to FIGS. 1 and 2), then the hydraulic medium present within the hydraulic chamber 43 can flow through the segment-shaped flow passages 55 between the edges of the plate valve 46a and the wall of the recess 27a into the flow through gap 56a. Accordingly, the hydraulic medium flows from the hydraulic chamber 43 into the bore 29a and thus via the longitudinal bore 37 and the transverse bores 38 of the stem 32 into the hydraulic chamber 39.

The flow through gap 56a at the end face 47a of the annular projection 51a functions as a throttle location as does the central flow through opening 56 in the plate valve 46 according to FIGS. 1 to 4 so that the hydraulic medium flows in a delayed manner from the hydraulic chamber 43 during return of the armature 25. With this measure a smooth return of the armature 25a is also ensured in this embodiment, and especially a pressure increase is ensured which acts against the return spring 9. The armature 25a, the stem 32, the ball 16 and the piston 7 thus rest firmly at one another. The radially extending flow through gaps 56a may be embodied with a width such that it cannot be plugged by contaminations in the hydraulic medium. It is automatically cleaned by the hydraulic medium, especially when the plate valve 46a during displacement of the armature 25a to the right (FIGS. 1 and 2) is lifted from the end face 47a. Then contaminants which might be present within the flow through gap 56a are reliably flushed out. Otherwise, this embodiment is identical to the embodiment according to FIGS. 1 to 4.

FIGS. 7 and 8 show a plate valve 46b that at its contact side 57 has a depression forming the flow through gap 56b. It extends from the plate edge and has a length so that it extends past the end face 47b of the annular projection 51b of the armature 25b. Accordingly, with the plate valve 46b seated on its seat a flow through opening for the hydraulic medium below the plate valve into the bore 29b is provided. Accordingly, the hydraulic medium can flow in the described manner during return of the armature 25b from the hydraulic chamber 43 via this flow through gap 56b into the bore 29b and thus via the longitudinal bore 37 and the transverse bores 38 of the stem 32 into the hydraulic chamber 39. This embodiment is also characterized by an automatic cleaning of the flow through gap 56 serving as the throttle passage so that contaminants present therein are flushed out when the plate valve 46b is lifted from the valve seat. Furthermore, the throttle passage 56b ensure that during return of the armature 25b due to the delayed flow of the hydraulic medium a pressure is built up within the hydraulic chamber 43 which counteracts the force of the return spring 9. With this measure, it is ensured in this embodiment that the piston 7, the valve ball 16, the stem 32, and the armature 25b are firmly resting at one another.

As is shown in FIG. 2, the prestress spring 28 with which the plate valve is pressed into its seat is supported within the recess 27, 27a by a lateral rolled-end portion 58. The end face 45 of the armature 25 is provided with a central flat depression 59 at the bottom of which the recess 27 opens centrally. In the embodiment represented in FIG. 2, the armature 25 rests with its end face 45 at the end face 44 of the magnet housing 21. The hydraulic chamber 43 is then formed by the two recesses 27 and 59 within the armature 25.

The embodiments according to FIGS. 5 to 8 are especially advantageous when for preset long switching times the diameter of the flow through opening 56 in the embodiment according to FIGS. 1 to 4 within the plate valve 46 are too small and the danger of plugging exists.

Figure 9:
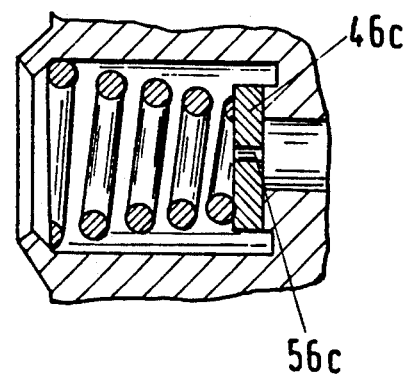
Figure 10:
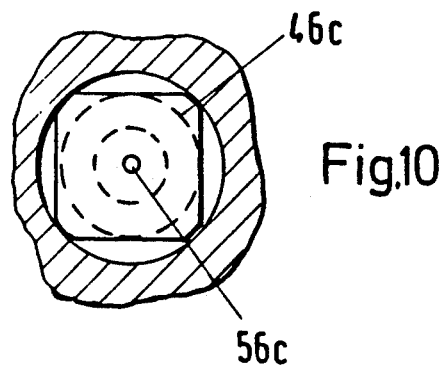

In the embodiment according to FIGS. 9 and 10, the plate valve 46 is provided with a central bore 56c as the throttle passage.

Figure 11:
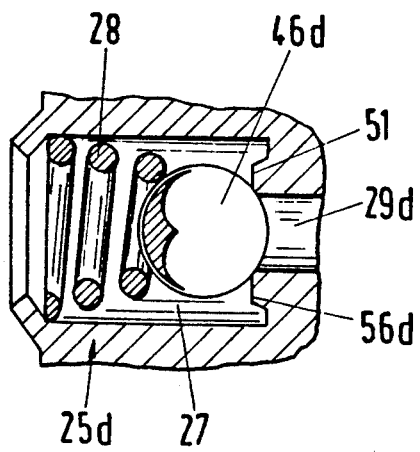
Figure 12:
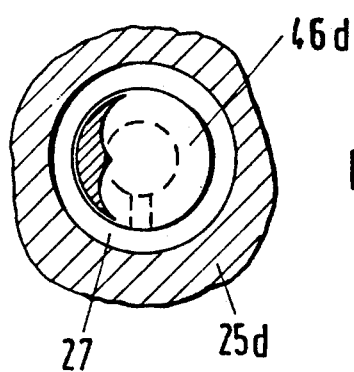

FIGS. 11 and 12 show an embodiment in which the valve 46d is a ball that is maintained in its rest position by the force of a pressure spring 28. A radial through opening is provided which provides a flow connection between the recess 27 and the bore 29 of the armature 25d.

Figure 13:
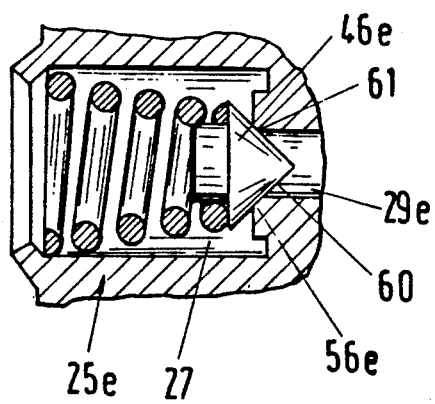
Figure 14:
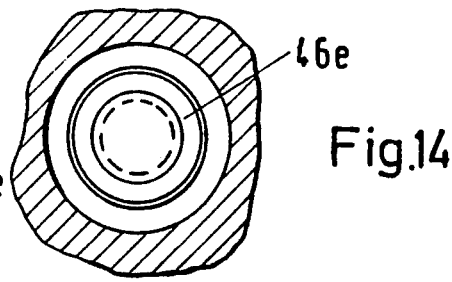

In the embodiments according to FIGS. 13 and 14 the valve 46e is conically shaped. It rests with its conical surface 60 at a corresponding conical surface 61 at the edge of the bore 29e of the armature 25e. In the conical surface 61 a depression 56e is provided as the throttle passage which provides a flow connection between the recess 27 and the bore 29e.

In the embodiments according to FIGS. 9 to 14, the solenoid valve operates in the same manner as has been explained in detail for or FIGS. 1 to 8. The embodiment of the hydraulic solenoid valve according to FIGS. 9 to 15 corresponds otherwise to the aforedescribed embodiment according to FIGS. 1 to 4.

For small throttle cross-sections, embodiments are especially advantageous in which the throttle passage is formed by grooves (FIGS. 1 to 8, 11 to 14). The grooves can be flushed during displacement of the armature from its initial position according to FIG. 1 because the valve lifts in the aforedescribed manner. Contaminants that might be lodged within the grooves can be easily flushed out. For greater throttle cross-sections it is advantageous with respect to cost considerations to provide the throttle passage in the form of a bore within the valve (FIGS. 9 and 10).

The present invention is, of course, in no way restricted to the specific disclosure of the specification and drawings, but also encompasses any modifications within the scope of the appended claims.

We claim:

1. A hydraulic solenoid valve comprising:
   a valve housing including bores for receiving a hydraulic medium and having at least one consuming device connection and a return connection connected to said bores;
   a piston connected within said valve housing, said piston having at least one piston bore;
   a first valve with a corresponding valve seat, said first valve connected to said piston for opening and closing said piston bore, said first valve in an open position providing communication between said consuming device connection and said return connection;
   a magnet housing;
   an armature connected within said magnet housing;
   a return spring connected between said piston and said valve housing, said armature in normal operation, when displacing said piston against the force of said return spring, resting at said first valve and closing said valve seat;
   a first hydraulic chamber between an end face of said magnet housing remote from said piston and an end face of said armature facing away from said piston and a second hydraulic chamber between a further end face of said magnet housing adjacent to said piston and a further end face of said armature facing said piston; and
   said armature having at least one connecting line for connecting said first and said second hydraulic chambers and a second valve that opens when said piston is displaced against the force of said return spring and closes when said piston is displaced by said force of said return spring, said connecting line having at least one throttle passage.

2. A hydraulic solenoid valve according to claim 1, wherein said first valve is a valve ball.

3. A hydraulic solenoid valve according to claim 1, wherein said throttle passage is arranged within the area of said second valve.

4. A hydraulic solenoid valve according to claim 3, wherein said second valve includes said throttle passage.

5. A hydraulic solenoid valve according to claim 3, wherein said second valve is plate-shaped.

6. A hydraulic solenoid valve according to claim 3, wherein said throttle passage is an opening penetrating said second valve and communicating with said at least one connecting line of said armature, said opening having a flow cross-section that is smaller than a flow cross-section of said at least one connecting line.

7. A hydraulic solenoid valve according to claim 3, wherein said second valve comprises a valve seat and wherein said throttle passage is a depression in said valve seat.

8. A hydraulic solenoid valve according to claim 3, wherein said second valve comprises a contact side for contacting the corresponding valve seat and wherein said throttle passage is a depression in said contact side.

9. A hydraulic solenoid valve according to claim 3, further comprising a spring for holding said second valve in a closed position.

10. A hydraulic solenoid valve according to claim 3, wherein said armature has a first end face and a second end face, said first end face having a first recess and said second end face having a second recess, with said at least one connecting line opening into said first and second recesses.

11. A hydraulic solenoid valve according to claim 10, wherein said second valve is connected within said first recess arranged remote from said piston.

12. A hydraulic solenoid valve according to claim 11, further comprising a stem arranged between said first valve and said second recess such that said stem contacts said first valve and rests at the bottom of said second recess.

13. A hydraulic solenoid valve according to claim 12, wherein said stem has a longitudinal bore that forms an extension of said at least one connecting line of said armature.

14. A hydraulic solenoid valve according to claim 13, wherein said magnet housing further comprises a hydraulic chamber delimited by said second end face and wherein said longitudinal bore communicates with said hydraulic chamber.

15. A hydraulic solenoid valve according to claim 11, further comprising at least one flow through passage between a radially outwardly oriented surface area of said second valve and an inner wall of said first recess.

16. A hydraulic solenoid valve according to claim 11, wherein said second valve is plate-shaped and has a square contour with rounded corners.

17. A hydraulic solenoid valve according to claim 16, wherein said second valve is guided with said rounded corners at said inner wall of said first recess.

18. A hydraulic solenoid valve according to claim 1, wherein said magnet housing further comprises a pressure tube, with said armature slidably connected with play within said pressure tube.

19. A hydraulic solenoid valve according to claim 1, wherein said connecting line is a bore penetrating said armature.

* * * * *